Patented Nov. 10, 1936

2,060,181

UNITED STATES PATENT OFFICE 2,060,181

ALKALI-METAL SALTS OF ANTIMONIO-THIOMALIC ACID

Marcel Delépine, Paris, and Paul Gailliot, Parc St. Maur, France, assignors to Societe des Usines Chimiques Rhone-Poulenc, Paris, France No Drawing. Application May 2, 1935, Serial No. 19,470. In Great Britain May 9, 1934

3 Claims. (Cl. 260—11)

The present invention relates to the production of antimony derivatives of thiomalic acid having therapeutic value.

It has been known for a long time that complex antimony compounds can be formed from organic substances containing the SH group. For therapeutic use it is always essential that these complex substances should satisfy certain conditions which are very rarely found united in one substance. The organic substance containing the thio-alcoholic group (SH) should be easy to obtain in a state of purity; the complex antimony compound derived from it should be stable, it should be sufficiently soluble in water and should give solutions capable of being administered by injection and it should satisfy various other well-known criteria for therapeutic use.

According to the present invention, we have found that lower alkali metal antimoniothiomalates fulfil all these conditions. In particular, although the derivatives of the monocarboxylic acids containing the SH group are liquid, thiomalic acid crystallizes very well and can be obtained in a perfectly pure condition. Our researches have furthermore shown that the sodium and lithium antimoniothiomalates derived from it are perfectly definite compounds. These substances are completely stable, are soluble in water and give solutions which can attain concentrations of 20 or 30% without its being necessary to add other substances not containing antimony to obtain such concentrations.

The following examples show how the invention may be carried out in practice, but it is to be understood that the invention is by no means limited to such examples:—

*Example 1.*—15 grams of pure thiomalic acid prepared according to the method of Biilmann, (Liebig's Annalen, vol. 339, page 371) are dissolved in sufficient caustic soda solution of density 1.33 to contain 12 grams of sodium hydroxide, and 7.6 grams of antimony chloride dissolved in 10 cc. of chloroform are then slowly added with cooling. When the combination is complete, a clear liquid of a slightly pink color is obtained containing the antimoniothiomalate and sodium chloride. By the addition of 200 cc. of 96% ethyl alcohol, the antimoniothiomalate separates out in the form of an oily liquid while at the same time the formation of crystals of sodium chloride can be seen. After decantation the oily liquid is dissolved in 20 cc. of anhydrous glycol and the solution obtained is filtered and slowly added with stirring to 400 cc. of methyl alcohol. The precipitate which separates is filtered, washed with methyl alcohol and then dried in a vacuum. The sodium antimoniothiomalate thus obtained furnishes a white powder. This substance is hygroscopic and is very soluble in water, but on the contrary is very slightly soluble in alcohol and in ether. Analysis of the product agrees with the formula:

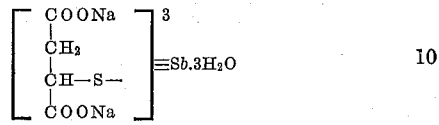

which requires 16.14% of antimony, whereas the analysis showed 16.20%.

The sodium antimoniothiomalate thus prepared is indefinitely stable in the solid state. Furthermore, its solutions can be tyndallized without alteration and can be kept for a very long time on condition that they are prepared and kept in the absence of oxygen.

*Example 2.*—15 grams of pure thiomalic acid prepared according to the method of Biilmann, (Liebig's Annalen, vol. 339, page 371) are mixed with 50 cc. of water and then 12.6 grams of lithium hydroxide having the composition LiOH, $H_2O$ are added. To the solution so obtained, after cooling there is then added a solution of 7.5 grams of antimony trichloride in 20 cc. of chloroform, and the mixture stirred.

When the reaction is finished, a pink liquid is obtained from which the lithium antimoniothiomalate is separated as a syrup by the addition of 125 cc. of ethyl alcohol, while the lithium chloride formed remains in the supernatant mother-liquor.

After decantation, the syrupy liquid is dissolved in 50 cc. of anhydrous glycol and the solution thus obtained is filtered and slowly added while stirring to 300 cc. of absolute alcohol. The precipitate which separates out is filtered, washed with absolute alcohol and then dried in a vacuum. The lithium antimoniothiomalate thus obtained furnishes a white powder, which is hygroscopic and is very soluble in water, but on the contrary is very slightly soluble in alcohol and in ether. Analysis of the product agrees with the formula:

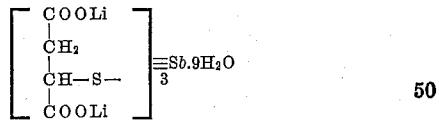

The lithium antimoniothiomalate thus prepared is indefinitely stable in the solid state. Furthermore, its solutions can be tyndallized without undergoing decomposition and can be kept for a very long time on condition that they are prepared and kept in the absence of oxygen.

What we claim and desire to secure by Letters Patent is:

1. As new compositions of matter the alkali metal salts of antimoniothiomalic acid.

2. As a new composition of matter the sodium salt of antimoniothiomalic acid.

3. As a new composition of matter the lithium salt of antimoniothiomalic acid.

MARCEL DELÉPINE.
PAUL GAILLIOT.